(12) United States Patent
Ballenger et al.

(10) Patent No.: US 8,156,006 B1
(45) Date of Patent: Apr. 10, 2012

(54) INVENTORY COMMINGLING AND RECONCILIATION OF INACCURACIES

(75) Inventors: David L. Ballenger, Kirkland, WA (US); Richard Brinkerhoff, Burien, WA (US); David Brown, Seattle, WA (US); John Chenault, Seattle, WA (US); Ian Clarkson, Seattle, WA (US); Jason Ho, Seattle, WA (US); Duane Krause, Seattle, WA (US); Jason Murray, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 936 days.

(21) Appl. No.: 11/867,081

(22) Filed: Oct. 4, 2007

Related U.S. Application Data

(62) Division of application No. 10/177,262, filed on Jun. 21, 2002, now Pat. No. 7,289,969.

(51) Int. Cl.
*G06G 1/14* (2006.01)
*G06Q 20/00* (2012.01)
*G06Q 10/00* (2012.01)

(52) U.S. Cl. .......................................... 705/22; 705/28

(58) Field of Classification Search .................... None
See application file for complete search history.

(56) References Cited

U.S. PATENT DOCUMENTS

| 4,550,246 | A  | * | 10/1985 | Markman ..................... 235/385 |
| 7,289,969 | B1 |   | 10/2007 | Ballenger et al. |
| 2002/0077937 | A1 |   | 6/2002 | Lyons et al. |
| 2002/0077982 | A1 | * | 6/2002 | Pellegrini ........................ 705/41 |
| 2003/0101107 | A1 |   | 5/2003 | Agarwal et al. |
| 2003/0120563 | A1 | * | 6/2003 | Meyer ............................. 705/28 |
| 2003/0120565 | A1 |   | 6/2003 | Church et al. |

\* cited by examiner

*Primary Examiner* — Asfand Sheikh
(74) *Attorney, Agent, or Firm* — Robert C. Kowert; Meyertons, Hood, Kivlin, Kowert & Goetzel, P.C.

(57) ABSTRACT

A facility for managing ownership of units of an item is described. The facility defines a commingling zone. For units of the item that are outside the commingling zone, the facility attributes ownership among a plurality of owners individually to each of the units. For units of the item that are inside the commingling zone, the facility attributes ownership among the plurality of owners to particular numbers of the units without attributing ownership individually to each of the units. The facility includes a method for reconciling ownership of units in the event of any discovered innacuracies.

12 Claims, 16 Drawing Sheets owner-undifferentiated inventory table — 300

| item identifier | distribution center identifier | location identifier | units | |
|---|---|---|---|---|
| 1141 | A | 52 | 5 | ← 311 |
| 1141 | A | 1963 | 35 | ← 312 |
| 1141 | B | 25 | 55 | ← 313 |
| 1141 | C | 67 | 4 | ← 314 |
| 1141 | C | 1201 | 48 | ← 315 |
| 1141 | C | 3000 | 144 | ← 316 |
| 1142 | A | 191 | 117 | ← 317 |
| ... | | | | |
| ↑ 301 | ↑ 302 | ↑ 303 | ↑ 304 | |

*Fig. 3* owner-differentiated inventory table — 450

| item number identifier | distribution center identifier | owner identifier | units |
|---|---|---|---|
| 1141 | A | 1 | 10 |
| 1141 | A | 3 | 0 |
| 1141 | A | 4 | 30 |
| 1141 | B | 3 | 55 |
| 1141 | C | 1 | 155 |
| 1141 | C | 3 | 41 |
| 1142 | A | 2 | 117 |
| ... | | | ... |

*Fig. 4* owner-differentiated inventory table — 650

| item identifier | distribution center identifier | owner identifier | units |
|---|---|---|---|
| 1141 | A | 1 | 10 |
| 1141 | A | 3 | 60 |
| 1141 | A | 4 | 30 |
| 1141 | B | 3 | 55 |
| 1141 | C | 1 | 155 |
| 1141 | C | 3 | 41 |
| 1142 | A | 2 | 117 |
| ... | ... | ... | ... |

*Fig. 6* owner-undifferentiated inventory table — 700

| item identifier | distribution center identifier | location identifier | units | |
|---|---|---|---|---|
| 1141 | A | 52 | 5 | — 711 |
| 1141 | A | 1963 | 95 | — 712 |
| 1141 | B | 25 | 55 | — 713 |
| 1141 | C | 67 | 4 | — 714 |
| 1141 | C | 1201 | 48 | — 715 |
| 1141 | C | 3000 | 144 | — 716 |
| 1142 | A | 191 | 117 | — 717 |
| ⋮ | ⋮ | ⋮ | ⋮ | |
| 701 | 702 | 703 | 704 | |

*Fig. 7* owner-undifferentiated inventory table — 900

| item identifier | distribution center identifier | location identifier | units | |
|---|---|---|---|---|
| 1141 | A | 52 | 25 | — 911 |
| 1141 | A | 1963 | 75 | — 912 |
| 1141 | B | 25 | 55 | — 913 |
| 1141 | C | 67 | 4 | — 914 |
| 1141 | C | 1201 | 48 | — 915 |
| 1141 | C | 3000 | 144 | — 916 |
| 1142 | A | 191 | 117 | — 917 |
| ... | ... | ... | ... | |

| item identifier | distribution center identifier | location identifier | units |
|---|---|---|---|
| 1141 | A | 52 | 22 |
| 1141 | A | 1963 | 75 |
| 1141 | B | 25 | 55 |
| 1141 | C | 67 | 4 |
| 1141 | C | 1201 | 48 |
| 1141 | C | 3000 | 144 |
| 1142 | A | 191 | 117 |
| ... | | | | owner-undifferentiated inventory table —1100

*Fig. 11* inventory adjustments table — 1380

| item identifier | distribution center identifier | owner identifier | units adjusted | date | balanced |
|---|---|---|---|---|---|
| 1141 | A | 1 | +1 | 1/15/2002 | no |
| 1141 | C | 3 | -1 | 1/30/2002 | no |
| 1142 | A | 2 | +3 | 1/31/2002 | no |
| ... | ... | ... | ... | ... | ... |

*Fig. 13*

Fig. 15 inventory adjustments table — 1580

| item identifier | distribution center identifier | owner identifier | units adjusted | date | balanced |
|---|---|---|---|---|---|
| 1141 | A | 1 | +1 | 1/15/2002 | yes |
| 1141 | A | 1 | -1 | 3/1/2002 | yes |
| 1141 | A | 3 | -1 | 3/1/2002 | no |
| 1141 | C | 4 | -1 | 3/1/2002 | no |
| 1141 | A | 3 | -1 | 1/30/2002 | no |
| 1142 | A | 2 | +3 | 1/31/2002 | no |
| ... | ... | ... | ... | ... | ... |

| | | owner-differentiated inventory table | |
|---|---|---|---|
| item identifier | distribution center identifier | owner identifier | units |
| 1141 | A | 1 | 9 |
| 1141 | A | 3 | 59 |
| 1141 | A | 4 | 29 |
| 1141 | B | 3 | 55 |
| 1141 | C | 1 | 155 |
| 1141 | C | 3 | 41 |
| 1142 | A | 2 | 117 |
| ... | ... | ... | ... |

*Fig. 16*

INVENTORY COMMINGLING AND RECONCILIATION OF INACCURACIES

CROSS-REFERENCE TO RELATED APPLICATION

This application is a divisional of U.S. patent application Ser. No. 10/177,262 filed Jun. 21, 2002 now U.S. Pat. No. 7,289,969 entitled "INVENTORY COMMINGLING AND RECONCILIATION OF INACCURACIES," which application is hereby incorporated by reference in its entirety.

TECHNICAL FIELD

The present invention is directed to the fields of inventory management and data structures therefor.

BACKGROUND

It is common for companies to operate physical facilities, often called "distribution centers," where they store units of products and other items, and from which they ship item units. The term "item" as used herein generally refers to a class of things, substantially identical instances—or "units"—of which class may be purchased, received, stored, sold, and/or shipped. As an example, a distribution center may receive five units of a Toshiba SD2710 DVD Player item, and later ship out one unit of this item, leaving it with four units of this item.

Types of companies operating distribution centers include: merchants that accept customer orders for item units in various ways, such as via telephone, fax, the World Wide Web, or electronic mail, and themselves operate one or more distribution centers to fulfill these orders by shipping the ordered item units to the ordering customers; product manufacturers that operate distribution centers to ship item units they've manufactured to wholesalers, distributors, retail merchants, and/or retail customers; wholesalers and distributors that operate distribution centers to receive item units from their manufacturers and ship them to retail merchants; and large retail merchants that operate many stores, who purchase large quantities of item units sold in the stores, hold the ordered item units in a distribution center until they are needed in the stores, and at that point ship item units from the distribution center to the stores.

It is often important to know what business entity ("owner") owns the item units residing in a distribution center. As one example, it is often important for an owner of item units to know whether the number of units of a particular item that it owns at a particular distribution center is adequate for its purposes; if not, it may need to order more of that item. Accordingly, most distribution centers use some sort of explicit or implicit approach to designate the entity that owns each unit of each item. For some distribution centers, all of the item units residing there belong to a single owner, which may either be the operator of the distribution center or a separate entity. Accordingly, any item unit present in such a distribution center is known to be owned by the single owner.

In other distribution centers, multiple owners each own some item units residing in the distribution centers. Such distribution centers typically employ one of two different conventional item unit ownership approaches. In the first conventional approach, for each item residing in a distribution center, only one owner (an "exclusive owner") owns any units of that item. Accordingly, when units of a particular item are present anywhere within the distribution center, they are known to be owned by the exclusive owner for that item. A significant disadvantage of the first conventional approach is that one owner utilizing a distribution center using this approach may be prevented from using the distribution center to distribute a particular item because a different owner is already using the distribution center to distribute that item.

In the second conventional approach, two or more owners may own units of the same item, but units of the item owned by different owners must be physically segregated from one another. For example, units of the same item owned by different owners may be stored in separate bins, or in different areas of the distribution center. Accordingly, the owner of a particular unit of such an item can be determined based upon the unit's location. A significant disadvantage of the second conventional approach is that it can become space- and labor-intensive to segregate units of the same item in this manner, making it less efficient and more expensive to operate the distribution center.

In light of the foregoing, a new approach to tracking the ownership of item units residing in a distribution center that required neither prohibiting more than one owner from owning units of the same item nor physical segregation of units of the same item owned by different owners would have significant utility.

BRIEF DESCRIPTION OF THE DRAWINGS

FIG. 3 is a sample owner-undifferentiated inventory table used to track the specific location of item units within commingling zones.

FIG. 4 shows a sample owner-differentiated inventory table used to track aggregate ownership of item units within commingling zones.

FIG. 6 shows a sample owner-differentiated inventory table updated by the facility in accordance with step 501 in the example.

FIG. 7 shows a sample owner-undifferentiated inventory table updated by the facility in accordance with step 502 in the example.

FIG. 9 shows a sample owner-undifferentiated inventory table updated by the facility in accordance with steps 801 and 802 in the example.

FIG. 11 shows a sample owner-undifferentiated inventory table updated by the facility in accordance with step 1001 in the example.

FIG. 13 shows a sample inventory adjustments table used to track prior unbalanced adjustments.

FIG. 15 shows alterations to the inventory adjustment table to reflect the attributions made in the example discussed above.

FIG. 16 shows a sample owner-differentiated inventory table updated by the facility in accordance with step 1003 in the example.

DETAILED DESCRIPTION

Figure 1:
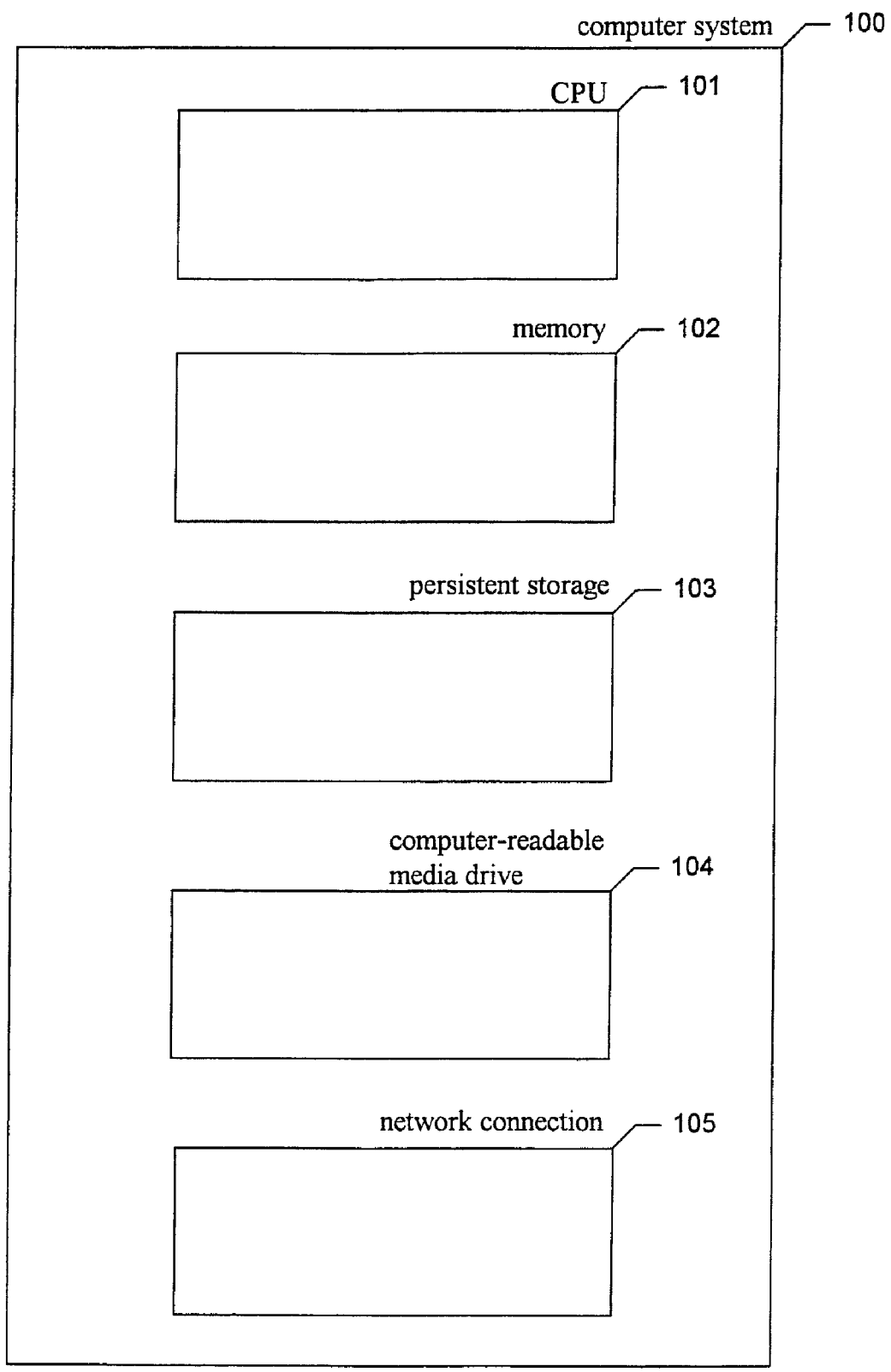
FIG. 1 is a block diagram showing some of the components typically incorporated in at least some of the computer systems and other devices on which a software facility executes.

A software facility for inventory commingling ("the facility") is provided that tracks ownership of item units residing in a particular region—such as in a distribution center—by different owners without limiting the number of owners owning units of the same item, and without necessitating physical segregation of units of the same item owned by different owners. In some embodiments, the facility defines one or more "inventory commingling zones," within which ownership is not attributed to individual units of an item; rather, ownership is attributed to a total number of units of the item within the commingling zone without specifically identifying these units. For example, a commingling zone may contain eight units of a Toshiba SD2710 DVD Player item, three units of which are owned by a first owner and five units of which are owned by the second owner. While these units are in the commingling zone, it is not known which units are owned by which owners.

In some embodiments, a separate commingling zone is defined to correspond to each of a number of distribution centers that are commonly operated. In these embodiments, for each combination of an item, a distribution center, and an owner, the total number of units of the item residing at the distribution center owned by the owner is maintained. While individual units of an item entering or leaving a distribution center are each attributed to specific owners, individual units of the item residing or moving within a distribution center are not.

In many cases, the facility enables an order for an instance of an item from a particular owner to be fulfilled using any convenient unit of the item within the commingling zone, irrespective of whether that unit was owned by that owner when it entered the commingling zone, thus making it easier to fulfill such orders. The facility typically also obviates the extra effort and/or storage space that would be needed to segregate—or otherwise individually track the ownership of—item units within a distribution center or other commingling zone. Those factors in turn make it easier and more profitable for distribution center operators to handle inventory for larger numbers of owners.

In some embodiments, the facility includes functionality for attributing the loss of item units expected to be in the commingling zone to specific owners, as well as for attributing the discovery of item units not expected to be in the commingling zone to specific owners, adjusting the facility's record of the total number of units of that item in the commingling zone owned by those owners. In various embodiments, such functionality utilizes one or more of the following approaches: attributing lost item units to an owner to which discovered units of the same item were earlier attributed, and attributing discovered item units to an owner to which lost units of the same item were earlier attributed; attributing lost or discovered item units to owners randomly, in some cases proportionally to the fraction of total units of the item owned by each owner; and attributing discovered items to the last owner on behalf of which units of the item were last received in the commingling zone. In this way, the facility expediently, and generally equitably, resolves inconsistencies between commingled inventory records and actual inventory levels within the commingling zone.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

In the discussion that follows, embodiments of the facility are described in conjunction with a variety of illustrative examples.

Figure 2:
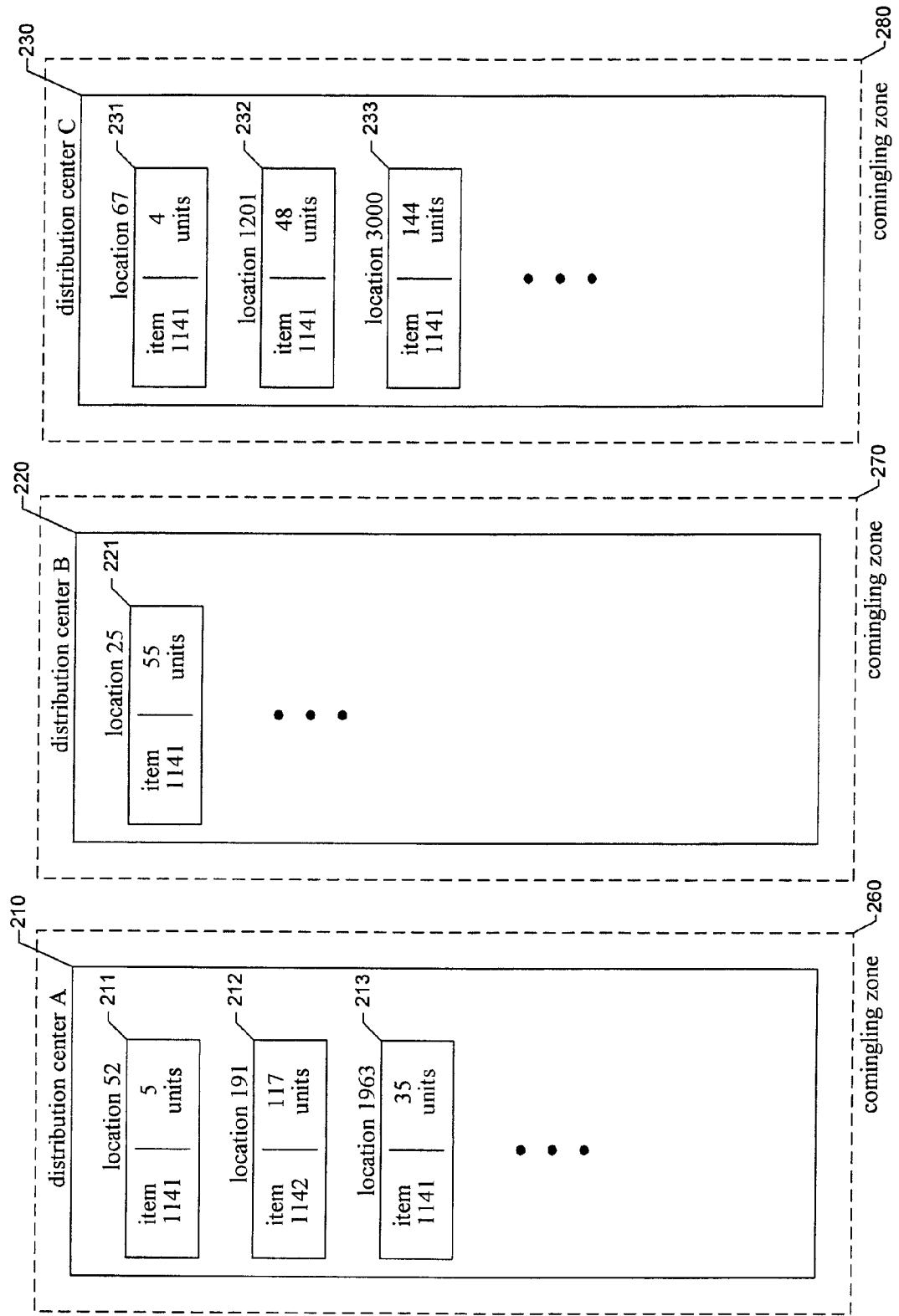
FIG. 2 is a schematic diagram showing the definition of a number of different commingling zones, and inventory contained therewithin.

FIG. 2 is a schematic diagram showing the definition of a number of different commingling zones, and inventory contained therewithin. FIG. 2 shows three different distribution centers, distribution center A 210, distribution center B 220, and distribution center C 230. Such distribution centers may be, for example, located in different cities. In this example, a separate commingling zone is defined for each of these distribution centers: commingling zone 260 is defined to be coextensive with distribution center 210, commingling zone 270 is defined to be coextensive with distribution center 220, and commingling zone 280 is defined to be coextensive with distribution center 230.

Partial location-based inventory information is shown for each distribution center. For example, boxes 211 and 213 show the number of units of the item having item identifier 1141 in two different locations within distribution center 110, the locations having location identifiers 52 and 1963, respectively. Box 211 shows that five units of the item having item identifier 1141 are present at location 52, while box 213 shows that 35 units of the item having item identifier 1141 are at location 1963. Units of a single item may be stored at any number of different locations within the distribution center. The figure shows that item 1141 has units at two different locations in distribution center 110, a single location in distribution center 120, and three different locations in distribution center 130. For example, units of an item may start out in a location that is in the receiving area of the distribution center, and from there may be moved first to a location that is in a longer-term storage area, and from there may be moved to a location that is in a shorter-term storage area, where order fulfillment takes place. In some embodiments, units of multiple different items may be stored in the same location (not shown). FIGS. 3 and 4 show tables typically used by the facility as part of an inventory model to track item inventory in distribution centers.

FIG. 3 shows a sample owner-undifferentiated inventory table used to track the specific location of item units within commingling zones. The owner-undifferentiated inventory table 300 is comprised of a number of rows, such as rows 311-317, each indicating the number of units of a particular item at a particular location within a particular distribution center. Accordingly, each row is divided into the following columns: an item identifier column 301 containing an item identifier identifying a particular item; a distribution center identifier column 302 containing a distribution center identifier identifying a particular distribution center; a location identifier column 303 containing the location identifier identifying a particular location within the distribution center whose distribution center identifier is in the distribution center identifier column; and a units column 304, containing the number of units of the identified item currently located at the identified location in the identified distribution center. For example, row 311 indicates that location 52 in distribution center A contains five units of item 1141. The owner-undifferentiated inventory table is used to track the location of commingled units of items without regard for which owner or owners may own these item units. In order to maintain its currency, the facility typically updates the owner-undifferentiated inventory table in some or all of the ways discussed below.

FIG. 4 shows a sample owner-differentiated inventory table used to track aggregate ownership of item units within commingling zones. The owner-differentiated inventory table 450 is comprised of a number of rows, such as rows 461-467, each indicating the total number of units of a particular item in a particular distribution center owned by a particular owner. Accordingly, each row is divided into the following columns: an item identifier column 451 containing an item identifier identifying a particular item; a distribution center identifier column 452 containing a distribution center identifier identifying a particular distribution center; an owner identifier column 453 containing an owner identifier identifying a particular owner; and a units column 454 containing the total number of units of the identified item within the identified distribution center currently owned by the identified owner. For example, row 461 indicates that distribution center A contains a total of 10 units of item 1141 that are owned by owner 1. The owner-differentiated inventory table is used to track the total number of commingled units of items in each distribution center that are owned by each owner. In order to maintain its currency, the facility typically updates the owner-differentiated inventory table in some or all of the ways discussed below.

One type of event that prompts the facility to update its inventory model is inter-zone inventory relocations. These are relocations either into or out of a particular commingling zone. As one example, an inter-zone inventory relocation occurs when units of an item are delivered to a distribution center from a manufacturer or other supplier on behalf of a particular owner. As another example, an inter-zone inventory relocation occurs when a unit of an item is returned to a distribution center by a customer that purchased it from a particular owner. As another example, an inter-zone inventory relocation occurs when an item unit is shipped to a customer that has purchased the item unit from a particular owner. As another example, an inter-zone inventory relocation occurs when a distribution center returns item units to a manufacturer or other supplier on behalf of a particular owner. As another example, a pair of inter-zone inventory relocations occurs when item units are transferred from a first distribution center to a second distribution center: the first inter-zone inventory occurs when the transferred item units are relocated out of the first distribution center, and the second inter-zone inventory occurs when the transferred item units are relocated into the second distribution center.

Figure 5:
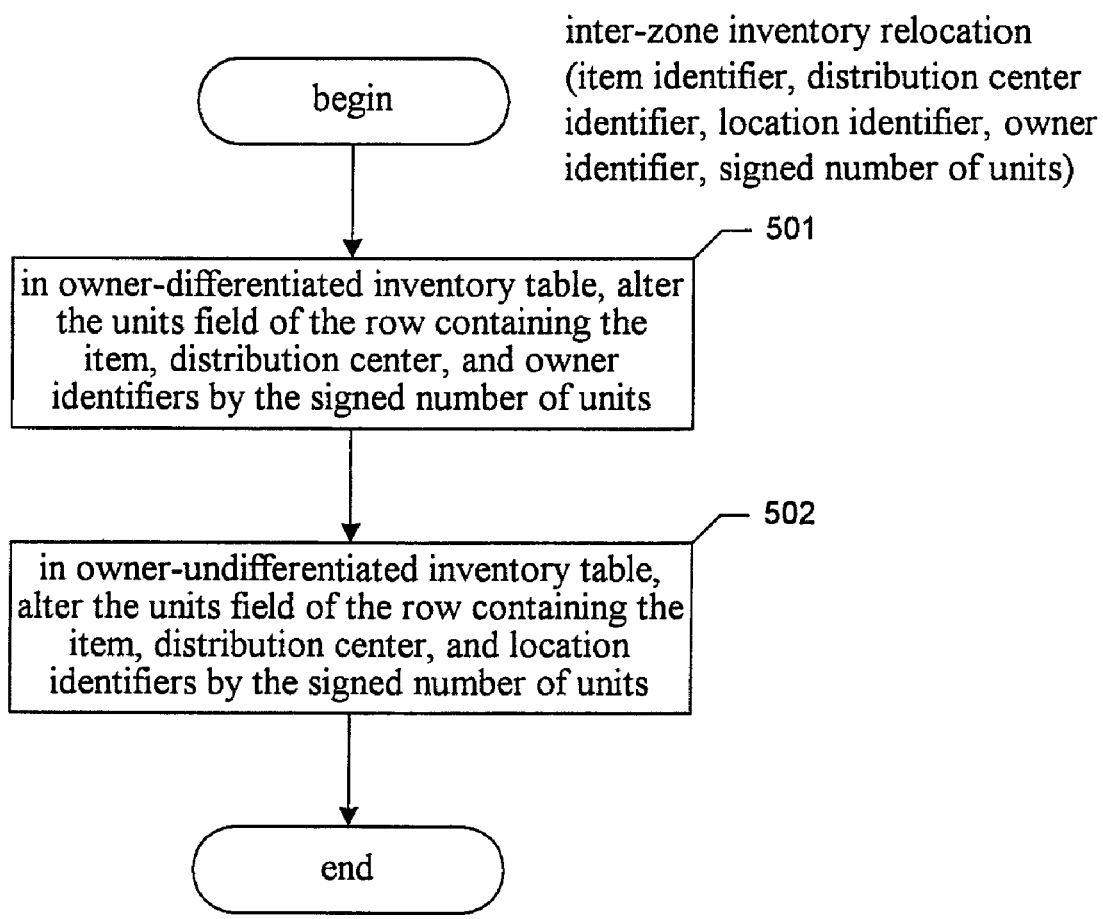
FIG. 5 is a flow diagram showing steps typically performed by the facility when an inter-zone inventory relocation occurs.

FIG. 5 is a flow diagram showing steps typically performed by the facility when an inter-zone inventory relocation occurs. These steps utilize the item identifier of the item being relocated, the distribution center identifier of the distribution center into or out of which the item is being relocated, the location identifier of the location within the distribution center into or out of which the item is being relocated, the owner identifier of the owner on whose behalf the item is being relocated, and the signed number of units of the item that are being relocated. For example, when 60 units of item 1141 are received for owner 3 in location 1963 of distribution center A, the item identifier is 1141, the distribution center identifier is A, the location identifier is 1963, the owner identifier is 3, and the signed number of units is +60. One of ordinary skill in the art will appreciate that FIG. 5, and the additional flow diagrams discussed further below, are merely exemplary, and that the described steps may be, for example, performed in a different order, at a different level of atomicity, and/or using a wide variety of programming tools and environments.

In step 501, the facility updates the owner-differentiated inventory table in accordance with the relocation by altering the units field of the row of the owner-differentiated inventory table containing the item, distribution center, and owner identifiers by the signed number of units.

FIG. 6 shows a sample owner-differentiated inventory table updated by the facility in accordance with step 501 in the example. In comparing FIG. 6 to FIG. 4, it can be seen that, in the units column 654, row 662 containing the item identifier 1141, the distribution center identifier A, and the owner identifier 3 has been changed from 0 to 60, reflecting an alteration of +60 units.

In step 502, the facility updates the owner-undifferentiated inventory table in accordance with the relocation by altering the units field of the row of the owner-undifferentiated inventory table containing the item, distribution center, and location identifiers by the signed number of units.

FIG. 7 shows a sample owner-undifferentiated inventory table updated by the facility in accordance with step 502 in the example. In comparing FIG. 7 to FIG. 3, it can be seen that, in the units column 704, row 712 containing the item identifier 1141, the distribution center identifier A and the location identifier 1963 has been changed from 35 to 95, reflecting an alteration of +60 units. After step 502, the steps shown in FIG. 5 conclude.

Another type of event that prompts the facility to update its inventory model is intra-zone inventory relocations. These are relocations from one location within a particular commingling zone to a different location within the same commingling zone. For example, intra-zone inventory relocations occur when units of an item are moved from a location in the receiving area of a distribution center to a location in a longer term storage area of the same distribution center, or from a location in a longer term storage area of a distribution center to a location in a shorter term storage area of the same distribution center.

Figure 8:
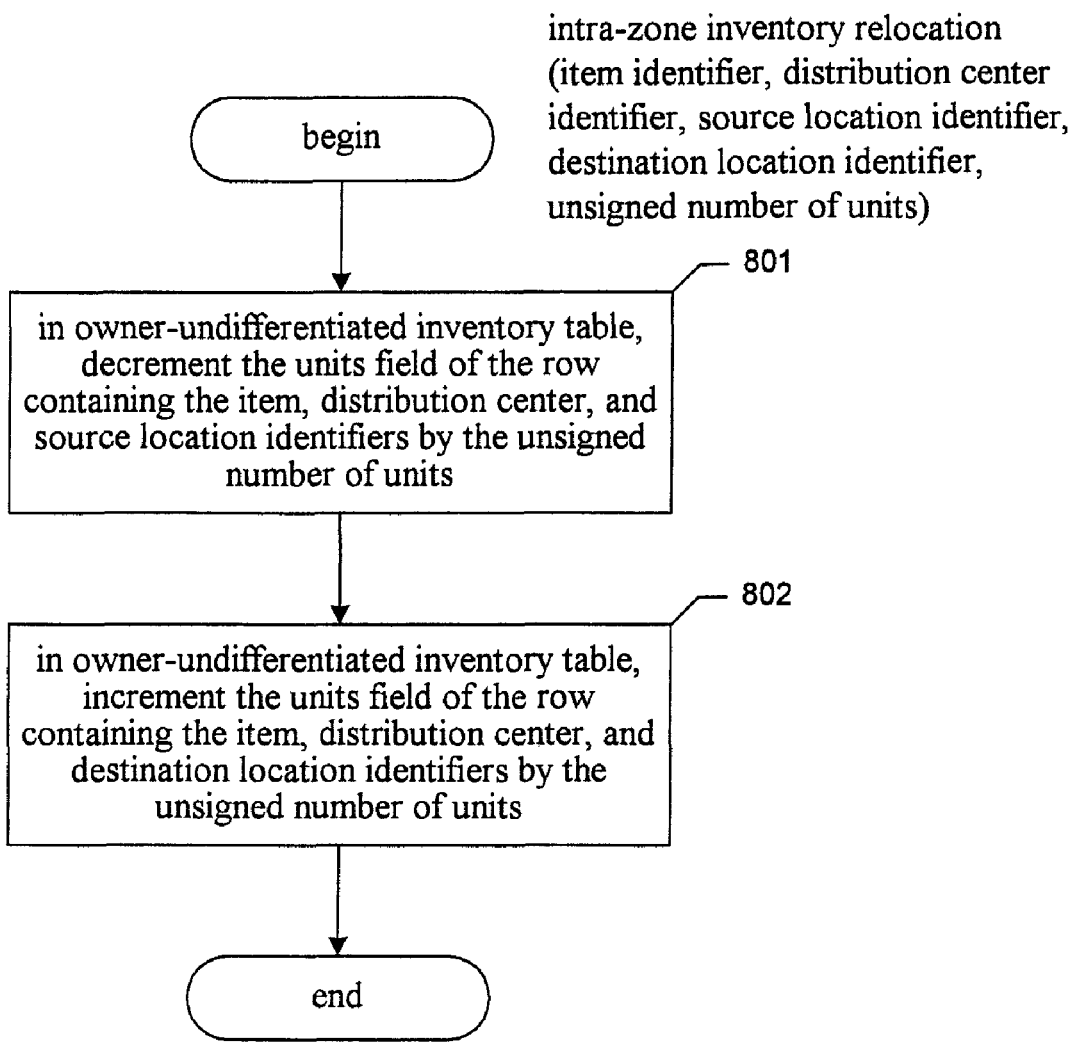
FIG. 8 is a flow diagram showing steps typically performed by the facility when an intra-zone inventory relocation occurs.

FIG. 8 is a flow diagram showing steps typically performed by the facility when an intra-zone inventory relocation occurs. These steps utilize the item identifier of the item being relocated, the distribution center identifier of the distribution center within which the item is being relocated, the location identifier of the source location from which the item is being relocated, the location identifier of a destination location to which the item is being relocated, and the signed number of units of the item that are being relocated. For example, when 20 units of item 1141 are relocated within distribution center A from location 1963 to location 52, the item identifier is 1141, the distribution center identifier is A, the source location identifier is 1963, the destination location identifier is 52, and the unsigned number of units is 20.

In step 801, the facility reduces the number of units of the item modeled as being stored in the source location by decrementing the units field of the row in the owner-undifferentiated inventory table containing the item, distribution center, and source location identifiers by the unsigned number of units.

FIG. 9 shows a sample owner-undifferentiated inventory table updated by the facility in accordance with steps 801 and 802 in the example. In comparing FIG. 9 to FIG. 7, it can be seen that, in the units column 904, row 912 containing the item identifier 1141, the distribution center identifier A, and the location identifier 1963 has been changed from 95 to 75, reflecting a reduction of 20 units.

In step 802, the facility increases the number of units of the item modeled as being stored in the destination location by incrementing the units field of the row in the owner-undifferentiated inventory table containing the item, distribution center, and destination location identifiers by the unsigned number of units.

Referring again to FIG. 9, it can be seen that, in the units column 904, row 911 containing the item identifier 1141, the distribution center identifier A, and the location identifier 52 has been changed from 5 to 25, reflecting an increase of 20 units. After step 802, the steps shown in FIG. 8 conclude. It should be noted that, because intra-zone inventory relocations do not change the total number of item units within any distribution center owned by any owner, the steps performed in response to an intra-zone inventory relocation typically need not include any updates to the owner-differentiated inventory table.

Another type of event that prompts the facility to update its inventory model is the discovery of inaccuracies in the inventory model. As one example, an inaccuracy in the inventory model may be identified when the number of units of a particular item residing in a particular location of a particular distribution center is determined to be different than the number of units listed for that item, distribution center, and location in the owner-undifferentiated inventory table. For example, an employee working in distribution center A may count the number of units of item 1141 residing in location 52 and determine that 22 units reside there, three fewer than the 25 units listed in column 904 of row 911.

Figure 10:
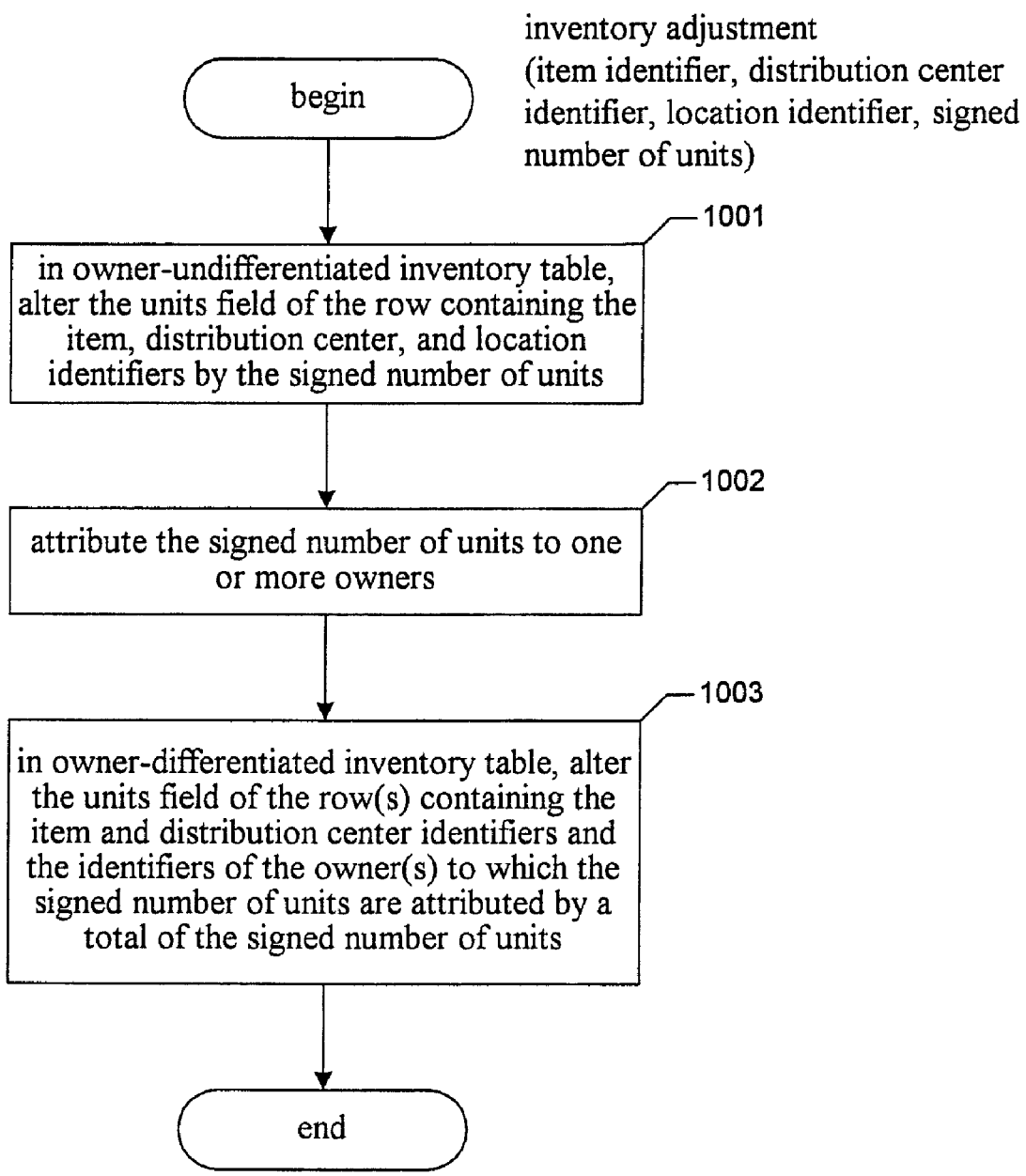
FIG. 10 is a flow diagram showing steps typically performed by the facility to perform an inventory adjustment when an inaccuracy is discovered in the facility's inventory model.

FIG. 10 is a flow diagram showing steps typically performed by the facility to perform an inventory adjustment when an inaccuracy is discovered in the facility's inventory model. These steps utilize the item identifier of the item being adjusted, the distribution center identifier of the distribution center in which the item is being adjusted, the location identifier of the location in which the item is being adjusted, and the signed number of units by which inventory in the item is being adjusted. In the example described in the preceding paragraph, the item identifier is 1141, the distribution center identifier is A, the location identifiers 52, and the signed number of units is −3.

In step 1001, the facility corrects the contents of the owner-undifferentiated inventory table in accordance with the adjustment by altering the units field of the row of the owner-undifferentiated inventory table containing the item, distribution center, and location identifiers by the signed number of units.

FIG. 11 shows a sample owner-undifferentiated inventory table updated by the facility in accordance with step 1001 in the example. In comparing FIG. 11 to FIG. 9, it can be seen that, in the units column 1104, row 1111 containing the item identifier 1141, the distribution center identifier A, and the location identifier 52 has been changed from 25 to 22, reflecting an alteration of −3 units.

In step 1002, the facility attributes the signed number of units to one or more owners.

Figure 12:
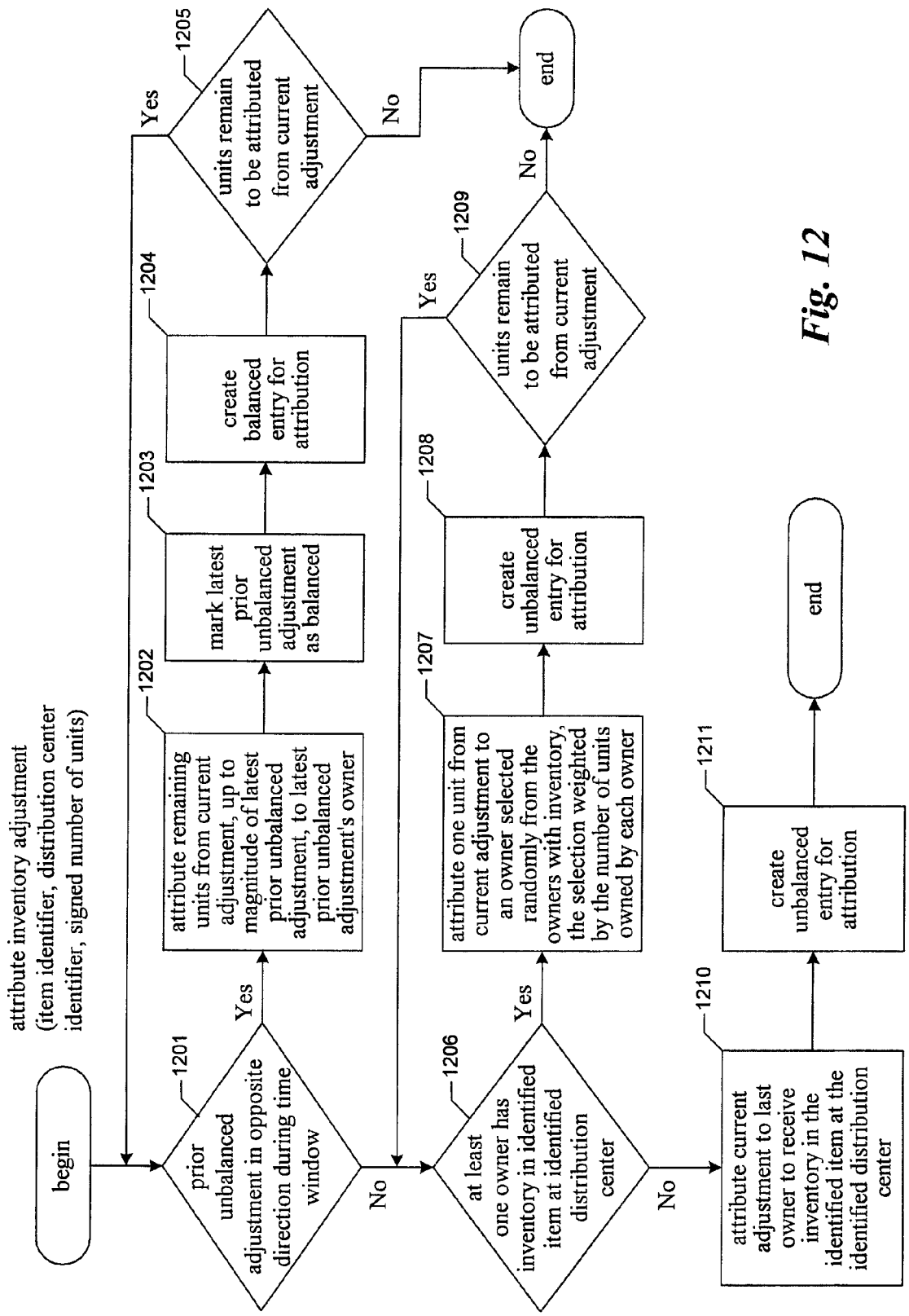
FIG. 12 is a flow diagram showing steps typically performed by the facility in order to attribute an inventory adjustment to one or more owners.

FIG. 12 is a flow diagram showing steps typically performed by the facility in order to attribute an inventory adjustment to one or more owners. These steps utilize the item identifier of the item being adjusted, the distribution center identifier identifying the distribution center in which the item is being adjusted, the location identifier of the location within the distribution center in which the item is being adjusted, and the signed number of units by which the item is being adjusted.

In step 1201, if a prior unbalanced adjustment in the opposite direction was made during an active time window, then the facility continues in step 1202, else the facility continues in step 1206.

FIG. 13 shows a sample inventory adjustments table used to track prior unbalanced adjustments. The inventory adjustments table 1380 is comprised of a number of rows, such as rows 1391-1393, each corresponding to an earlier-made inventory adjustment. Each row is divided into the following columns: an item identifier column 1381 containing the item identifier of the adjusted item; a distribution center identifier column 1382 containing a distribution center identifier identifying the distribution center in which the adjustment was made; an owner identifier column 1383 containing the owner identifier of the owner to which the adjustment was attributed; a units adjusted column 1384 containing the signed number of units adjusted; a date column 1385 containing the date on which the adjustment was performed; and a balanced column 1386 indicating whether the adjustment has been balanced by a subsequent adjustment. For example, row 1391 indicates that, on Jan. 15, 2002, one unit of item 1141 "found" in distribution center A was attributed to owner 1 by increasing by one the count of units of 1141 in distribution center A owned by owner 1; this adjustment has not yet been balanced.

In order to perform step 1201, the facility examines the inventory adjustments table 1380 to determine whether there are any rows that satisfy all of the following conditions: the item identifier of the row is the same as the item identifier of the item being adjusted; the distribution center identifier of the row is the same as the distribution center identifier of the distribution center in which the adjustment is occurring; the sign of the signed number of units adjusted of the row is opposite the signed number of units for the adjustment; the date of the row is no more than a maximum number of days in the past, such as 90; and the row indicates that the adjustment to which it corresponds is not balanced. In the example, this test initially succeeds, as row 1391 contains item identifier 1141 associated with the current adjustment, distribution center identifier A associated with the current adjustment, a positive signed number of units adjusted, a date within the last 90 days, and an indication that the adjustment to which row 1391 corresponds is not balanced.

In step 1202, the facility attributes units from the current adjustment not yet attributed to any owner, up to the magnitude of the latest prior unbalanced adjustment for this item, distribution center, and direction, to the owner to which the latest prior unbalanced adjustment was attributed. In the case of the example, because the prior adjustment represented by row 1391 is the only prior adjustment that may be balanced with the current adjustment, one unit of the current adjustment is attributed to the owner identified in row 1391, owner 1. In step 1203, the facility marks the latest prior unbalanced adjustment as balanced. As will be seen in FIG. 15, discussed further below, the facility modifies column 1386 of row 1391, changing its value from no to yes to indicate that this prior adjustment has been balanced. In step 1204, the facility creates a balanced entry identifying the attribution made in step 1202. As will be seen in FIG. 15 discussed below, a balanced entry is added to the inventory adjustments table reflecting this attribution of one unit of the adjustment to owner 1. In step 1205, if units from the current adjustment remain to be attributed, then the facility continues in step 1201, else the steps conclude. In the example, 2 of the original 3 units of the current adjustment remain to be attributed, so the facility continues in step 1201 to repeat the test for prior unbalanced adjustments in the opposite direction during the time window. This time, the test of step 1201 fails, and the facility continues in step 1206.

In step 1206, if the owner-differentiated inventory table indicates that at least one owner has inventory in the identified item at the identified distribution center, then the facility continues in step 1207, else the facility continues in step 1210. In step 1207, the facility attributes one unit from the current adjustment to an owner selected randomly from the owners having inventory in the identified item at the identified distribution center. In some embodiments, the selection of an owner in step 1207 is weighted, in the case of each owner, by the number of units owned by that owner in the identified distribution center.

Figure 14:
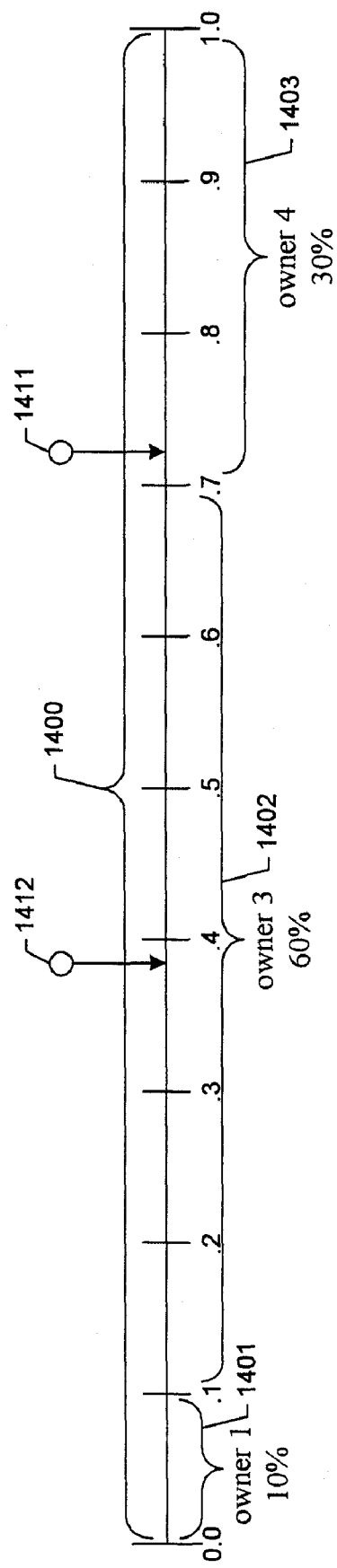
FIG. 14 is a diagram showing a sample weighted random selection in accordance with step 1207.

FIG. 14 is a diagram showing a sample weighted random selection in accordance with step 1207. In the sample selection, the owner-differentiated inventory table indicates that one unit of the identified item is owned by owner 1 at the identified distribution center, 6 units of the identified item are owned by owner 3 at the identified distribution center, and 3 units of the identified item are owned by owner 4 at the identified distribution center. Accordingly, a selection range 1400 between the values of 0 and 1 is divided into three subranges: subrange 1401 for owner 1, subrange 1402 for owner 3, and subrange 1403 for owner 4. The size of each subrange is directly proportional to the number of units of the identified item owned by each owner at the identified distribution center. To select an owner, the facility generates a random value 1411 in the range between 0 and 1. Because the generated random value falls within subrange 1403 for owner 4, one unit of the current adjustment is attributed to owner 4 in step 1207.

In step 1208, the facility creates an unbalanced entry in the inventory adjustments table for the attribution of step 1207. In step 1209, if units fo the current adjustment remain to be attributed, then the facility continues in step 1206, else the steps conclude. In the example, one of the original 3 units of the current adjustment remain to be attributed, and the facility continues in step 1206. Because at least one owner still has inventory in the identified item at the identified distribution center, step 1207 is repeated in the example; selection of random value 1412, within subrange 1402 for owner 3, causes the final unit of the current adjustment to be attributed to owner 3 in step 1207, for which an unbalanced entry is created in step 1208. At this point, in the example, no units remain to be attributed from the current adjustment, so these steps conclude.

In step 1210, because no owner has any inventory in the identified item at the identified distribution center, the facility attributes any remaining units of the current adjustment to the last owner to receive inventory in the identified item at the identified distribution center. In step 1211, the facility creates an unbalanced entry for the attribution of step 1210. After step 1211, these steps conclude.

FIG. 15 shows alterations to the inventory adjustment table to reflect the attributions made in the example discussed above. In comparing FIG. 15 to FIG. 13, it can be seen that the contents of column 1586 in row 1691 have been changed from no to yes, to reflect that the adjustment corresponding to row 1391, which was originally unbalanced, has now become balanced by the current adjustment. It can also be seen that row 1596-1598 have been inserted in the inventory adjustments table. Row 1596 corresponds to the attribution of one unit of the negative adjustment to owner 1, in order to balance the prior unbalanced adjustment represented by row 1391. Row 1596 is indicated to be balanced. Row 1597 and 1598 correspond to the attribution of one unit of the current adjustment to each of owners 3 and 4. These two rows indicate that these adjustments are unbalanced.

Returning to FIG. 10, in step 1003, after attributing the current adjustment to one or more owners, the facility updates the owner-differentiated inventory table, by altering the units field of the row or rows of the owner-differentiated inventory table containing the item and distribution center identifiers, and the identifiers of the owner or owners to which the signed number of units are attributed in step 1002 by a total of the signed number of units.

FIG. 16 shows a sample owner-differentiated inventory table updated by the facility in accordance with step 1003 in the example. In comparing FIG. 16 to FIG. 6, it can be seen that the value in column 1654 for each of rows 1561-1563 has been decreased by one unit to reflect the attribution of one unit of the current adjustment to each of owners 1, 3, and 4. At this point, both the current owner-differentiated inventory table shown in FIG. 16, and the current owner-undifferentiated inventory table shown in FIG. 11 reflect a total number of 97 units of item 1141 in distribution center A, and are therefore now consistent in that respect. After step 1003, the steps conclude.

In various embodiments, the facility stores inventory data in a variety of forms that differ from the sample forms shown in the figures discussed above. More particularly, relative to the sample forms shown and discussed, the data may be: rearranged; consolidated into a smaller number of tables; distributed across a greater number of tables; compressed, encrypted, or otherwise encoded; stored in a repository other than a conventional database; etc. As one example, in certain embodiments, a single table is used, in which each row uniquely corresponds to a single item, and in which a first subset of the columns contain counts of the number of units of the item owned by different owners irrespective of the location of the units, and a second subset of the columns contain counts of the number of units of the item residing in different locations irrespective of the ownership of the units. As another example, in certain embodiments, the owner-differentiated inventory table, the owner-undifferentiated inventory table, or both contain an additional column for unit condition, facilitating the tracking of units based upon their condition. The condition column may contain such values as sellable, defective, damaged by vendor or carrier, damaged by customer, or damaged within distribution center. As another example, in certain embodiments, the owner-differentiated inventory table contains additional information about the number of units of each item owned by each owner that have already been assigned to a particular order. (In this context, "assigned to a particular order" means that a customer has ordered one or more units of each item, but the units have not yet been removed from the inventory location for shipping purposes.) This enables the facility to decline to fulfill incoming orders for a particular owner when all of that owner's inventory has already been assigned to earlier-received orders.

It will be appreciated by one of ordinary skill in the art that the above-described facility may be straightforwardly adapted or extended in various ways. For example, commingling zones may be defined to be areas that are not coextensive with a single distribution center. Further, the facility may be used with virtually any kind—or kinds—of items. Further, the facility may update its inventory model in response to types of events other than inter-zone relocations, intra-zone relocations, and adjustments. Further, the facility may treat real-world events other than those described specifically above as being among one or more of the above-listed types of events. While the foregoing description makes reference to preferred embodiments, the scope of the invention is defined solely by the claims that follow and the elements recited therein.

The invention claimed is:

1. A computer-implemented method, comprising:
performing by one or more computers:
identifying an inconsistency between a commingled plurality of instances of a common class and a stored representation of said commingled plurality of instances, wherein different owners own different quantities of instances of said commingled plurality of instances, wherein the commingled plurality of instances are commingled at a common facility;
assigning each of said different owners to a different subrange of a range of values, wherein the size of each subrange is based on the quantity of instances held by the respective owner;
randomly selecting a value from said range of values; and
within said stored representation, attributing the inconsistency to the instances owned by the owner that is assigned to the subrange in which the randomly selected value resides.

2. The method of claim 1 wherein the identified inconsistency is caused by damage to an instance.

3. The method of claim 1 wherein the identified inconsistency is caused by destruction of an instance.

4. The method of claim 1 wherein the identified inconsistency is caused by loss of an instance.

5. The method of claim 1 wherein the instances are substantially-indistinguishable physical objects.

6. The method of claim 1 wherein the instances are different bodies of data each entitling their possessor to substantially the same right.

7. A non-transitory computer-readable medium storing contents that are executable to cause a computing system to update ownership records indicating, for a commingled set of instances of a common class, different quantities of instances owned by each of a plurality of owners, the contents being executable to:
detect a current change in total quantity of instances in the commingled set, wherein the current change is not directly attributable to any of the plurality of owners;
in response to determining that an eligible prior change in the total quantity of instances in the commingled set was attributed to a distinguished one of the owners, attribute the current change to the distinguished owner in said ownership records;
in response to determining that no eligible prior change in the total quantity of instances in the commingled set was attributed to one of the owners, probabilistically select one of the plurality of owners such that the probability that each owner is selected is proportional to the total quantity of instances owned by that owner, and attribute the current change to the selected owner in said ownership records.

8. The computer-readable medium of claim 7 wherein the contents of the computer-readable medium further cause the computer system to, in response to determining that the total quantity of instances owned by each of the plurality of owners is zero, attribute the current change to the owner for which instances were most recently added to the commingled set, the attribution of the current change to that owner being recorded in said ownership records.

9. The computer-readable medium of claim 7 wherein the contents of the computer-readable medium further cause the computer system to modify, in accordance with the current change, the total quantity of instances owned by the owner to which the current change is attributed.

10. The medium of claim 7 wherein the commingled plurality of instances of a class are physical items stored in a common distribution center.

11. A computing system, comprising:
a memory;
a processing unit, wherein the memory comprises program instructions that are executable on the processing unit to:
identify an inconsistency between a commingled plurality of instances of a common class and a stored representation of said commingled plurality of instances, wherein different owners own different quantities of instances of said commingled plurality of instances, wherein the commingled plurality of instances are commingled at a common facility;
assign each of said different owners to a different subrange of a range of values, wherein the size of each subrange is based on the quantity of instances held by the respective owner;
randomly select a value from said range of values; and
within said stored representation, attributing the inconsistency to the instances owned by the owner that is assigned to the subrange in which the randomly selected value resides.

12. One or more computer memories of a computer, the one or more memories collectively containing an inventory data structure comprising a plurality of entries, each entry identifying a respective owner from a plurality of owners and specifying, of a plurality of commingled units of the same item stored as inventory in a common facility, a quantity of those units for which ownership is attributed to the respective owner, wherein at least some of the plurality of entries specify different quantities of those units are owned by respective owners, wherein the quantity of units specified by a given entry identifying a selected owner is dependent upon both (1) a determination that the quantity of the plurality of commingled units has been reduced in a manner not directly attributable to any of the identified owners, and (2) a probabilistic selection of the selected owner performed such that the probability that a given owner being selected from said plurality of owners is proportional to the quantity of units owned by that owner; wherein said plurality of entries are configured to be utilized by said computer to reconcile one or more inaccuracies in a stored representation of said inventory.

* * * * *